US007100735B2

(12) United States Patent
Burton et al.

(10) Patent No.: US 7,100,735 B2
(45) Date of Patent: Sep. 5, 2006

(54) ELECTRICAL POWER ASSISTED STEERING SYSTEM

(75) Inventors: Tony Burton, Solihull (GB); Angel L. Andres Fernandez, Birmingham (GB)

(73) Assignee: TRW LucasVarity Electric Steering Limited, (GB)

( * ) Notice: Subject to any disclaimer, the term of this patent is extended or adjusted under 35 U.S.C. 154(b) by 0 days.

(21) Appl. No.: 10/960,768

(22) Filed: Oct. 7, 2004

(65) Prior Publication Data

US 2005/0150711 A1   Jul. 14, 2005

Related U.S. Application Data

(63) Continuation of application No. PCT/GB03/01562, filed on Apr. 9, 2003.

(30) Foreign Application Priority Data

Apr. 9, 2002   (GB) ................................ 0208090.1

(51) Int. Cl.
   *B62D 5/04* (2006.01)
(52) U.S. Cl. ........................................ 180/446; 701/41
(58) Field of Classification Search ................ 180/443, 180/446; 701/41, 42, 43
   See application file for complete search history.

(56) References Cited

U.S. PATENT DOCUMENTS 6,286,621 B1 *  9/2001  Mukai et al. ................ 180/446
6,658,335 B1 * 12/2003  Kleinau ........................ 701/41
6,742,620 B1 *  6/2004  Eidam et al. ................ 180/446
6,883,637 B1 *  4/2005  Nishizaki et al. ........... 180/446
2002/0017421 A1 *  2/2002  Stevens et al. ............. 180/446
2003/0074120 A1 *  4/2003  Kleinau ........................ 701/41
2003/0132053 A1 *  7/2003  Stevens et al. ............. 180/446

FOREIGN PATENT DOCUMENTS

EP   1 170 196   1/2002
GB   2 205 286  12/1998

* cited by examiner

*Primary Examiner*—Anne Marie Boehler
(74) *Attorney, Agent, or Firm*—MacMillan, Sobanski & Todd, LLC

(57) ABSTRACT

An electric power assisted steering system comprising a steering mechanism which operatively connects a steering wheel to the road wheels of the vehicle, a torque sensing means (6) adapted to produce a first output signal indicative of the torque carried by a portion of the steering mechanism (7), a means (6) for producing a second output signal indicative of the angular velocity of the steering wheel, a difference means (21) for determining the difference in value of the torque carried by a portion of the column between two points in time to produce a third output value, an electric motor (1) operatively connected to the steering mechanism, a signal processing unit (7) adapted to receive the two signals and to produce a torque demand signal representative of a torque to be applied to the steering mechanism by the motor (1), and a motor drive stage adapted to provide a drive current to the motor (1) responsive to the torque demand signal, and in which the torque demand signal (1) includes a damping component that is dependent upon both the first output signal, the second output signal and the third output signal.

16 Claims, 6 Drawing Sheets

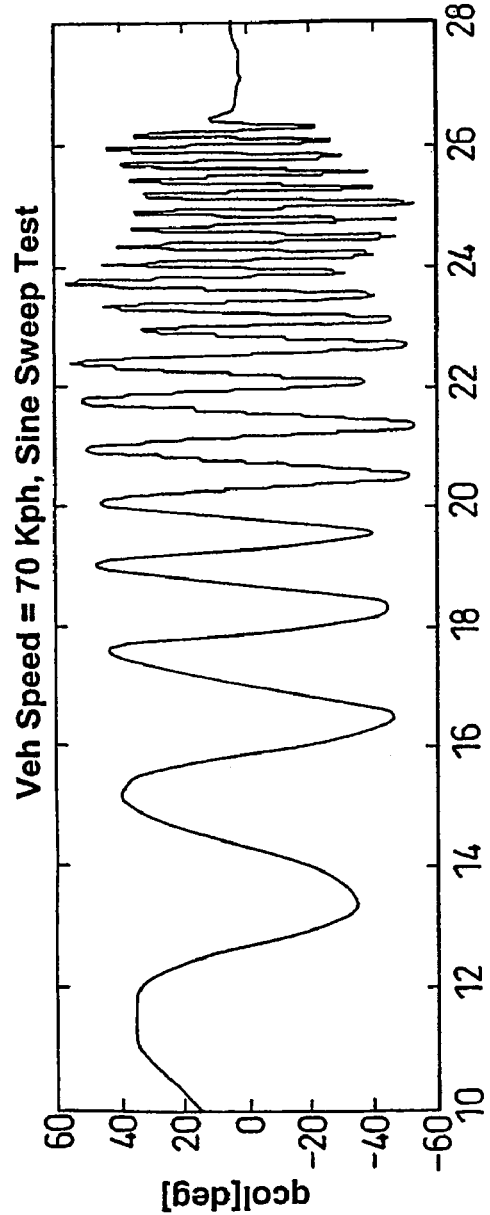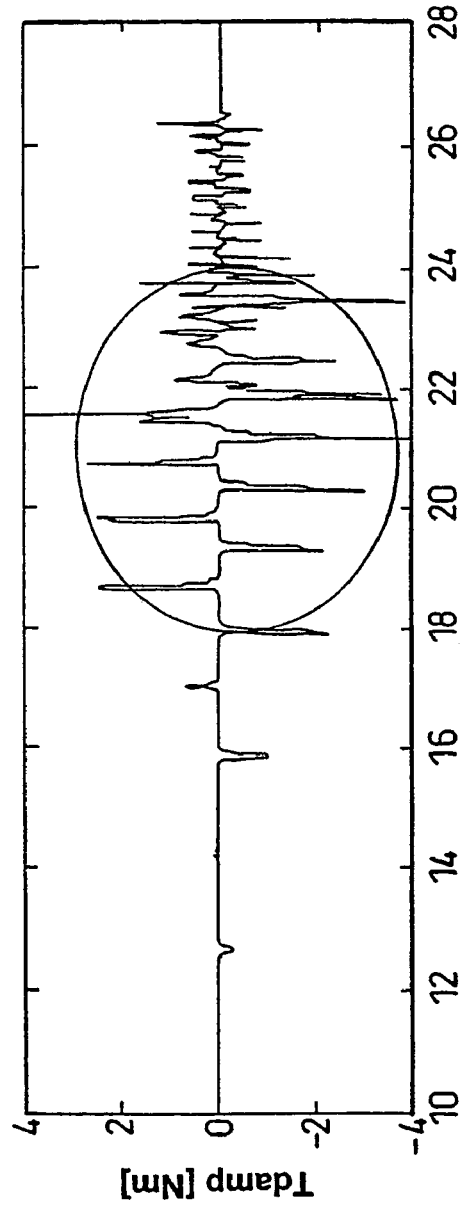
*Fig. 7(a)*
*Fig. 7(b)*

ELECTRICAL POWER ASSISTED STEERING SYSTEM

CROSS REFERENCE TO RELATED APPLICATIONS

This application is a continuation of International Application No. PCT/GB03/01562 filed Apr. 9, 2003, the disclosures of which are incorporated herein by reference, and which claimed priority to Great Britain Patent Application No. 0208090.1 filed Apr. 9, 2002, the disclosures of which are incorporated herein by reference.

BACKGROUND OF THE INVENTION

This invention relates to electrical power assisted steering systems of the kind in which an electrical motor is adapted to apply an assistance torque to a steering component such as a steering column so as to reduce the driver effort required to control the vehicle.

In a simple electric power assisted steering system a torque sensor is provided which is arranged so that the level of torque in a steering column is measured. From this measurement a controller calculates the value of a torque demand signal which includes an assistance torque component that is indicative of the torque that is to be generated by an electric motor attached to the steering column. The motor applies an assistance torque to the column of the same sense as that demanded by the driver and thus reduces the effort needed to turn the wheel.

A problem with this simple arrangement occurs in certain driving manoeuvres which excite a vehicle yaw mode transient response—leading to so-called "fish-tailing" of the vehicle. These manoeuvres are typically the result of "unsupported" driver actions on the handwheel such as rotational "flicks" where the driver applies a rapid handwheel angle change but does not follow it through with any substantial applied torque or perhaps releases the handwheel after initiating a rapid turn.

In such circumstances it is desirable that the handwheel returns to the central "straight-ahead" position quickly and with a minimum amount of overshoot or oscillation. In general, however, geometric and inertial effects of the steering system contribute to a free mode yaw response that is lightly damped and quite oscillatory—particularly at high vehicle speeds.

It is known in the art to overcome this problem by including a damping component within the torque demand signal that is used to drive the motor. This damping component in some sense mimics the mechanical phenomenon of viscous friction through software by generating a component of torque demand that is a function of the handwheel velocity. The damping component generally increases in magnitude as a function of steering angular velocity from zero torque at zero rotational speed to a maximum at some arbitrary maximum speed. In effect, the damping component reduces the actual torque output by the motor, and hence the amount of assistance, in a particular instance when the velocities are high. This gives increased damping and hence stability at high vehicle speeds.

It is further known to provide an electric power assisted steering system in which the damping component is a function of the torque carried by as well as angular velocity of the steering column with the damping component being reduced at low torques compared to the magnitude of the damping component at high torques. Thus, in hands free manoeuvres where no torque is present in the column the damping will be relatively high and yet be lower during hands on manoeuvres in which torque is generally present in the column.

The reduction of damping at low torques in this way will always be a compromise between the requirements of damping during hands on manoeuvres and hands off manoeuvres. In order to minimise the intrusion of damping during hands on manoeuvres it has been proposed to make the threshold at which the damping switches from a high value to a low value very close to zero torque. This has been found to minimise the intrusion of the damping during hands on manoeuvres.

The use of a very low switching threshold value, whilst generally presenting a good steering feel, can produce some undesired effects during a swerve or rapid lane change in which the driver is holding on to the wheel (hands on) and rapidly rotates the wheel first one way and then back in the other direction. In this type of manoeuvre the driver will be demanding rapid oscillatory changes in the vehicle direction over time, and the steering wheel velocity and the torque applied to the wheel will conform to an approximately sinusoidal pattern. During a swerve there will be moments when the driver applied torque and the velocity will peak and also when the torque passes though zero torque on at least one occasion. The low threshold will ensure that no undesired damping is present at all times in this type of manoeuvre except for a band around the zero torque crossing in which case the damping will suddenly increase as the torque approaches zero and then decrease after the zero crossing. In effect, the system is confused into thinking that the point around the zero torque crossing corresponds to a hands off situation in which damping is needed. This is illustrated in FIGS. 7(a) and 7(b) which are plots of column position and damping torque over time during a simulated series of swerves of a small passenger type car. Feeding a frequency swept sinusoidal input into a model of the system simulated the swerving.

SUMMARY OF THE INVENTION

An object of the present invention is to ameliorate the above problem associated with the prior art steering system.

In accordance with a first aspect the invention an electric power assisted steering system comprising a steering mechanism which operatively connects a steering wheel to the road wheels of the vehicle, a torque sensing means adapted to produce a first output signal indicative of the torque carried by a portion of the steering mechanism, a means for producing a second output signal indicative of the angular velocity of the steering wheel, a difference means for determining the difference in value of the torque carried by a portion of the column between two points in time to produce a third output value, an electric motor operatively connected to the steering mechanism, a signal processing unit adapted to receive the three signals and to produce a torque demand signal representative of a torque to be applied to the steering mechanism by the motor, and a motor drive stage adapted to provide a drive current to the motor responsive to the torque demand signal, in which the torque demand signal comprises a steering assistance component which is dependent upon the first signal and a damping component that is dependent upon both the first output signal, the second output signal and the third output signal.

By making the damping component dependent upon the difference in torque in the column over time as well as column velocity and torque it is possible to distinguish between a steady state of zero torque in the column and a zero crossing and make the damping value generated different in each case.

It is preferred that the damping component and assistance component are combined using an additive function. By this we may mean that the two components are added together or that one is subtracted from the other. It is most preferred that the damping component is subtracted from the assistance component as this provides for a simpler understanding of the components—an increase in assistance component means more assistance is provided and an increase in damping component will result in more "damping" being applied.

An assistance component can be produced which is independent of the output of the second and third output signals. It may be produced by applying a scaling function to the first output signal. This may be achieved by passing the first output signal (torque) through an amplifier.

The assistance component may generally increase with increasing torque applied by the driver. The assistance component may be a function of other variables such as vehicle speed.

The output of the difference means provides a measure of the rate of change of torque. An output signal may be produced at regular time intervals, or in a most advantageous arrangement, the difference means may comprise a differentiator which may differentiate the torque value represented by the first output signal. The difference means may produce the third output signal by differentiating the second output signal.

Such a differentiator may in effect produce a continuous output indicating the rate of change since in effect the two points of time used will be infinitely close together.

The torque signal may be filtered prior to differentiating using a low pass filter. The differentiating and filtering may be performed in a single stage using a function which may take the form:

$$H(s) = \frac{\omega_t s}{s + \omega_t}$$

where $\omega_t$ is the low pass cut off frequency of the filter and s is the Laplace transform. The use of a filter is advantageous where the torque signal is noisy The cut-off may be set to be at or slightly above the highest expected rate of change that could arise due to the movement of the wheel by the driver, i.e. typically about 0.1 to 5Hz.

The magnitude of the damping component preferably generally increases over a range of steering velocity values bounded by a first velocity and a second, higher, velocity. Thus, as steering velocity is increased more damping is introduced. The first velocity may correspond to zero column velocity. The second velocity may correspond to the maximum expected column velocity or some other arbitrarily selected value. Alternatively, a deadband may be provided whereby the damping component value remains at or about zero over a range of velocities bounding zero velocity. The width of this deadband may be varied in use, and may for example be varied as a function of vehicle speed or another measured parameter.

The magnitude of the damping component may generally increase linearly as a function of column velocity over the whole or a part of the range of values. Thus, the value of the damping component may become generally higher as the angular velocity of the, steering wheel increases. However, a non-linear relationship may exist between velocity of the steering wheel and the damping component value.

In the preferred arrangement the rate of increase of the magnitude of the damping component between the first and second values preferably decreases as a function of applied torque. The damping component, in one arrangement, may be produced by generating a first intermediate value which is a function of the second output signal indicative of the angular velocity of the steering wheel, a second intermediate value by producing a scaling value that is a function of the first output signal indicative of the torque carried by a portion of the steering mechanism, and a third intermediate value by producing a scaling value that is a function of the third output signal from the difference means, and in which the damping component is produced by multiplying the first intermediate value with the second intermediate value and the third intermediate value.

The scaling value may vary from a maximum value at zero applied torque to a minimum value at a predetermined maximum applied torque. In this case, for torque values at or above the maximum then a zero valued damping component will be produced.

The scaling value may be adapted to be substantially zero valued over a range of measured torque values bounding zero torque. This provides a deadband either side of zero torque about which for a given steering wheel velocity a maximum damping component is produced, improving steering feel for high speed on centre manoeuvres.

In a further refinement the width of the deadband may be varied as a function of the speed of the vehicle to which the steering system is fitted. A measurement of vehicle speed may therefore be provided to a third input of the signal processor.

The difference value may be greater at zero rate of change than at higher rates of change. It may vary between a maximum value at zero rate of change and a minimum value at a maximum predetermined rate of change.

A high rate of change during normal driving of a vehicle will typically occur on a zero torque crossing during a hands on manoeuvre. The above arrangement reduces the scaling factor in this situation and reduces the intrusion of damping in hands on manoeuvres. A zero rate of change will typically correspond to a hands off manoeuvre in which case the scaling value is not reduce and damping levels kept relatively high. Thus, the spike in damping that occurred in the prior art at the zero crossing in a swerve can be eliminated since a zero crossing in a swerve and a hands off manoeuvre can be distinguished from one another.

The signal processor may calculate the value of the damping component for any given combination of torque and steering wheel velocity from entries in a look-up table. In this case, each or specific combinations of steering velocity and driver input torque will access a specified value stored in the table.

In a preferred alternative, the value of the damping component may be derived by entering the velocity, torque and optionally vehicle speed values into a suitable equation.

Whilst the provision of a damping component that is a function of torque as well as angular velocity of the steering column provides appropriate levels of damping during "hands-on" slalom manoeuvres it can, in certain circumstances, induce unwanted torque variations in the steering column shaft. For example, when a high frequency driver applied torque is generated, or the column kicks back due to impacts on the road wheels, the torque dependent damping component can interact with the applied torque setting up an unpleasant oscillation. Thus, the driver applied torque can affect the damping torque which in turn affects the driver applied torque and so on.

In a refinement, to ameliorate such an effect the damping component may be filtered to remove high frequency variations in the damping component caused by high frequency changes in the column torque. Thus, the system may include limiting means adapted to limit the rate of change of the damping component due to corresponding changes in column torque to a predetermined maximum rate.

Preferably, the rate limiting means may comprise a filter. This may comprise a lower pass filter, when in one arrangement may have a cut-off frequency of approximately 3 Hz (Hertz).

In a most convenient arrangement, where the damping component comprises the product of a scaling value that is a function of torque and an intermediate damping value that is a function of the column velocity, the limiting means may be arranged to limit the rate of change of the scaling value over time. The scaling value may be low-pass filtered prior to multiplication by the intermediate damping value to generate the damping component.

The low-pass filter may be a frequency domain filter but may be of any known kind, typically a discrete digital filter implemented on a microprocessor. Of course, any processing of the scaling value which limits the maximum rate of change of the scaling value over time could be employed.

It is most preferred that the torque dependent scaling factor that may be used to generate the damping value is scaled by a value dependent upon the rate of change of torque prior to any such frequency domain filtering.

According to a second aspect the invention provides an electric circuit which includes signal processing means having at least one input terminal and at least one output terminal for use in combination with an electric motor of an electrically actuated steering system, the circuit being arranged to receive at the input terminal a first signal indicative of the torque carried by a portion of the steering system, a second signal indicative of the angular velocity of a steering wheel of the steering system, a third output signal indicative of the rate of change of the torque carried by a portion of the steering system between two points in time, and in which the signal processing means is adapted to produce at the output terminal a torque demand signal which comprises a steering assistance component which is dependent upon the first signal and a damping component that is dependent upon both the first output signal, the second output signal and the third output signal.

The damping component and the assistance component may be produced at respective output terminal of the circuit. The two components may then be passed across a network to a motor drive circuit which produces an appropriate drive signal to be applied to the electric motor. The network may comprise a bus which forms a part of a wiring loom for a vehicle which includes a steering system. This allows the circuit to be provided at a location remote from the electric motor.

The circuit may comprise an ASIC.

Alternatively or additionally the circuit may include a memory which stores program instructions which when running on the processing means causes the processing means to produce the torque demand signal from the input signals.

According to a third aspect the invention provides a computer program which includes machine readable instructions which when executed by a processor cause the processor to provide-the circuit of the second aspect of the invention.

According to a fourth aspect the invention provides a data carrier which includes machine readable instructions which when executed by a processor cause the processor to provide an electric circuit according to the third aspect of the invention.

The data carrier may comprise a memory which forms a part of an integrated circuit such as an area of read only semiconductor memory.

Other advantages of this invention will become apparent to those skilled in the art from the following detailed description of the preferred embodiment, when read in light of the accompanying drawings.

BRIEF DESCRIPTION OF THE DRAWINGS

FIG. 7($a$) is a plot of column position against time and FIG. 7($b$) is a plot of damping torque against time for a prior art steering system as fitted to a passenger vehicle travelling at 70kph subjected to a simulated swept sinusoidal wheel movement.

DETAILED DESCRIPTION OF THE INVENTION

Figure 1:
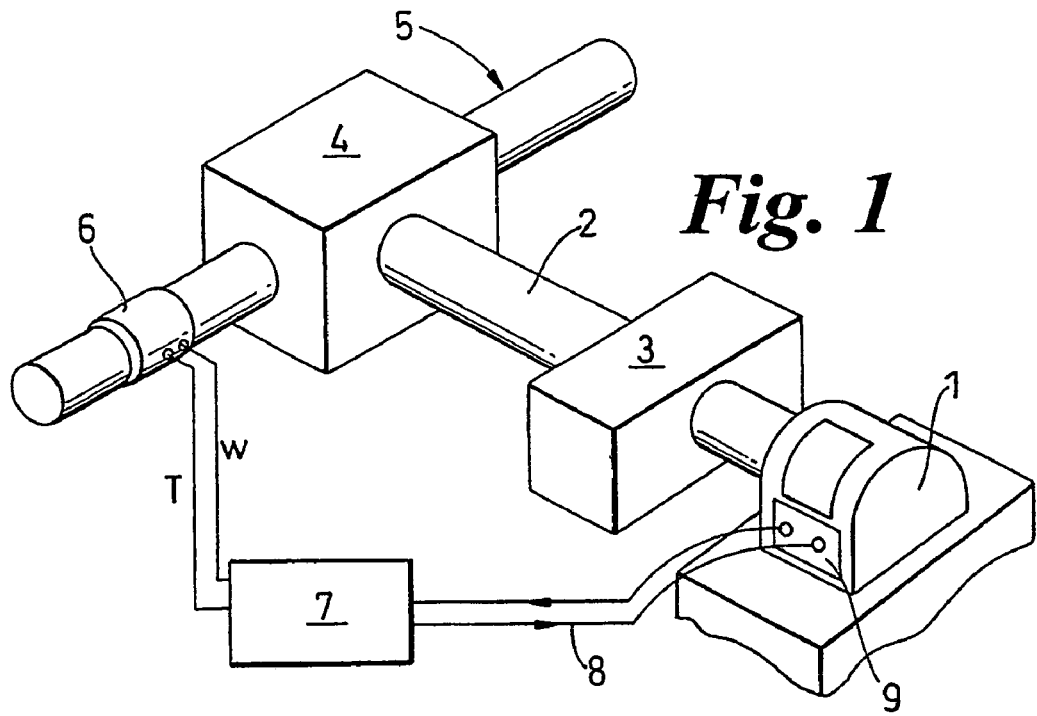
FIG. 1 is a schematic diagram of an electric power assisted steering system in accordance with the present invention.

An electric power assisted steering system is illustrated in FIG. 1 of the accompanying drawings. The system comprises an electric motor 1 which acts upon a drive shaft 2 through an (optional) gearbox 3. The drive shaft 2 terminates with a worm gear 4 that co-operates with a wheel provided on a portion of a steering column 5 or a shaft operatively connected to the steering column.

The steering column 5 carries a torque sensor 6 that is adapted to measure the torque carried by the steering column that is produced by the driver of the vehicle as the steering wheel (not shown) and hence steering column is turned against the resisting force provided by the vehicles road wheels (also not shown). The output signal T from the torque sensor 6 is fed to a first input of an electric circuit which includes a signal processing means 7. This is typically an ASIC dedicated integrated circuit.

An angular velocity sensor is also provided on the steering column shaft. As shown in FIG. 1 this is an integral part of the torque sensor 6. This produces an output signal indicative of the angular velocity ω of the shaft. The output from the velocity sensor is fed to a second input of the electric circuit 7.

Furthermore a column position sensor is provided which produces an output signal $N_{col}$ indicative of the angular position of the steering column.

Three input values are passed to the signal processor: column velocity ω, column angular position $N_{col}$ and column torque T.

The circuit 7 acts upon the three input signals to produce, as its output, a torque demand signal 8 that is passed to a motor controller 9. The motor controller 9 converts the torque demand signal 8 into drive currents for the electric motor 1.

The value of the torque demand signal 8 corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

The motor controller 9 receives as its input the torque demand signal and produces currents that are fed to the motor to reproduce the desired torque at the motor drive shaft 2. It is this assistance torque applied to the steering column shaft 5 that reduces the effort needed by the driver to turn the wheel.

Figure 2:
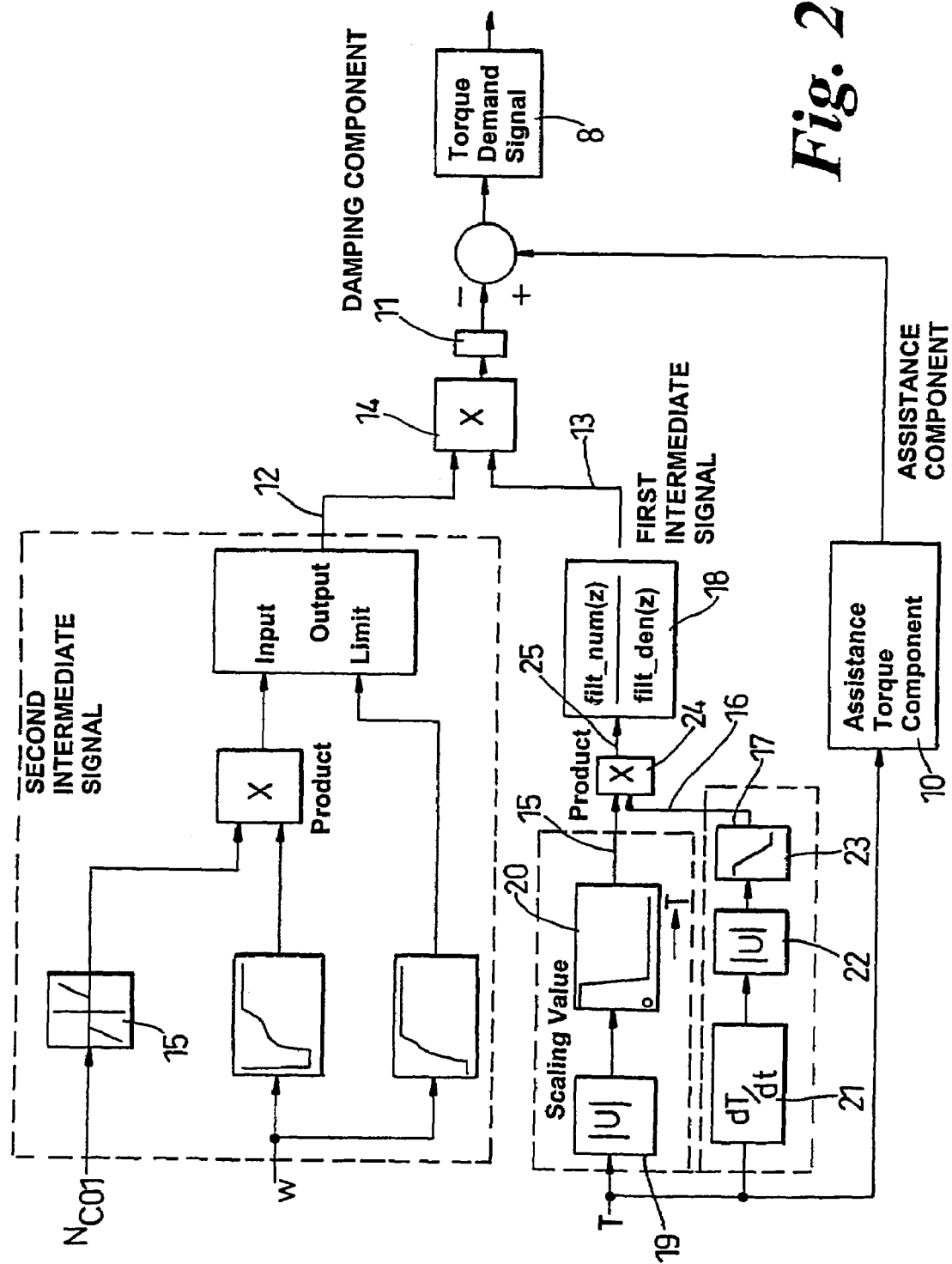
FIG. 2 is a block diagram illustrating the functional steps undertaken within the signal processing unit of the system of FIG. 1.

FIG. 2 illustrates the functional steps undertaken by the circuit 7 in producing the torque demand signal 8. It can be seen that the torque demand signal 8 is produced as two components: an assistance torque component 10 and a damping component 11. These two components 10,11 are additively combined within the circuit to form the final torque demand signal 8.

Figure 3:
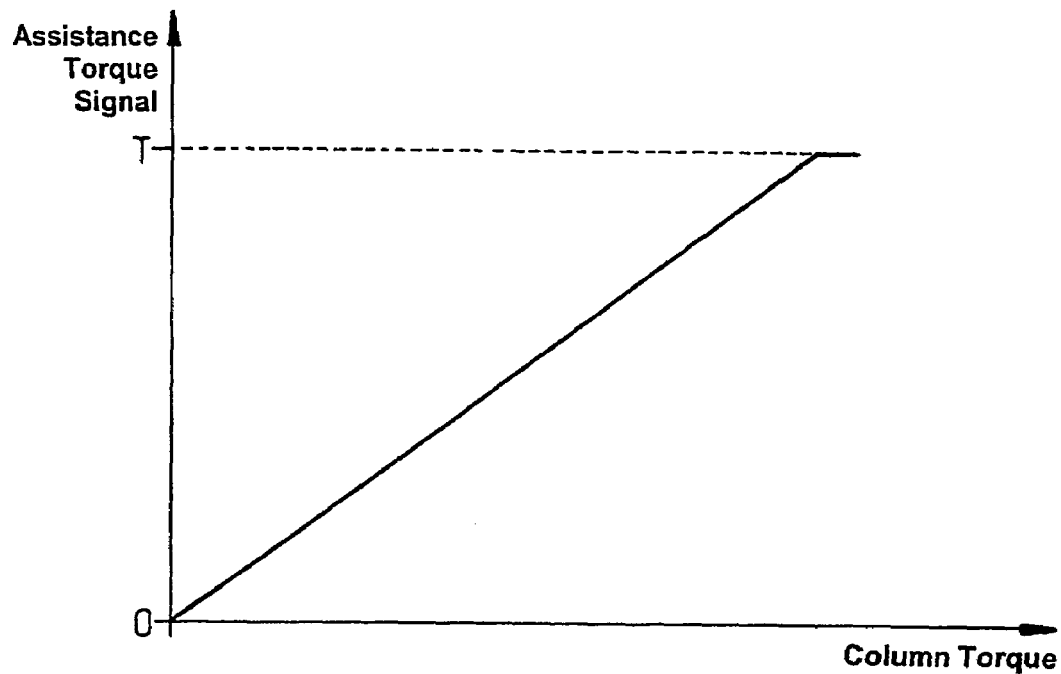
FIG. 3 illustrates the relationship between the torque applied by the driver and the assistance torque value generated.

The assistance torque component 10 is derived as a function of the torque in the steering column as measured by the torque sensor 6. The relationship between the measured torque and the assistance signal is essentially linear as shown in the plot of FIG. 3. However, other possible relationships may be used to map the torque to the assistance signal. In both cases, as torque increases the magnitude of the assistance signal increases. It will also be understood that the assistance torque signal 10 may be dependent upon other parameters such as vehicle speed if required. In that case it is typical to reduce the value of the assistance torque signal 10 at high speeds to enhance stability and increase it at very low speeds to ease parking manoeuvres.

Figure 4:
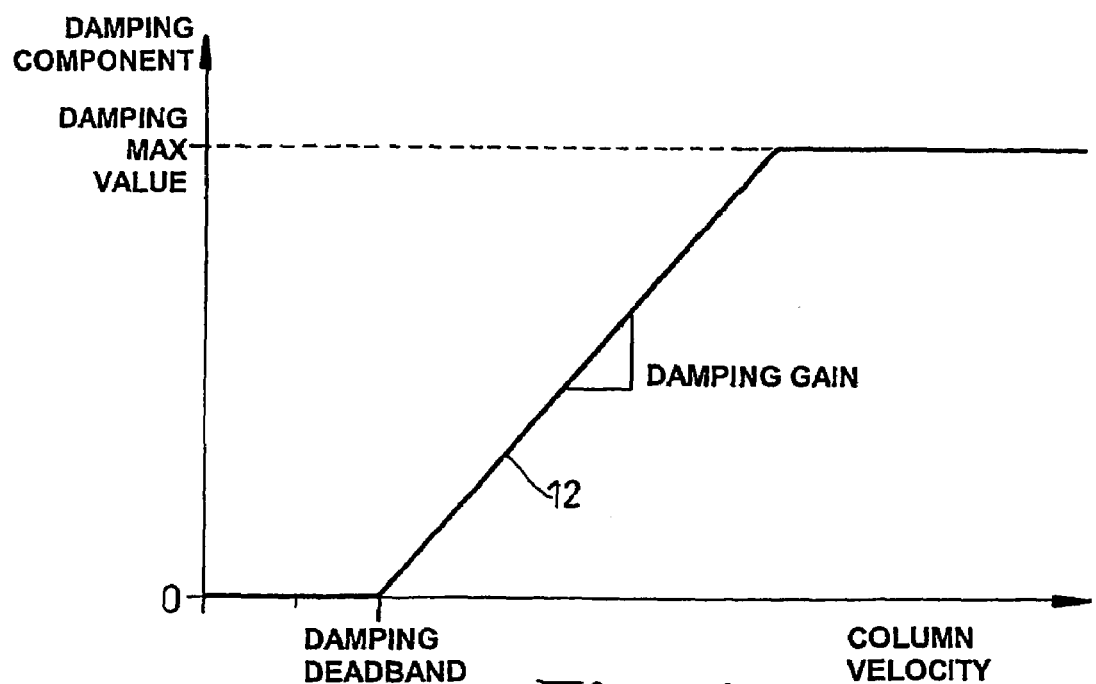
FIG. 4 illustrates the relationship between the damping component and the column velocity.

The damping component 11 is produced as a function of the measured torque, the rate of change of torque, column position and the column velocity. As shown in FIG. 4, an intermediate damping signal 12 is produced as a linear function of column velocity column velocity ω and column absolute angle position $N_{col}$ to introduce a position dependent deadband about the straight ahead position of the steering column.

The intermediate damping signal 12 increases in value from zero at zero column velocity to a maximum value at a predetermined column velocity (typically 2 revolutions per second). Of course, for different applications both the peak damping value and the velocity corresponding to this value may be varied. Above 2 revolutions per second the intermediate damping signal value remains constant. A deadband is also provided around zero velocity which may be of variable width. Thus, the value of the damping component remains at or about zero for a range of velocities within the deadband.

The intermediate damping signal 12 is then modified as a function of torque by calculating another intermediate damping signal which includes a scaling value 13 and multiplying the intermediate damping signal 12 by the scaling value 13 using a multiplier 14.

As shown in FIG. 2 of the accompanying drawings, the scaling value 13 is produced by calculating an initial scaling value 15 which is a function of torque, a torque difference value 16 which is multiplied 17 with the initial scaling value 15 to produce an intermediate damping value 16, and then passed through a filter 18 prior to combining with the other intermediate damping signal 12.

Figure 5:
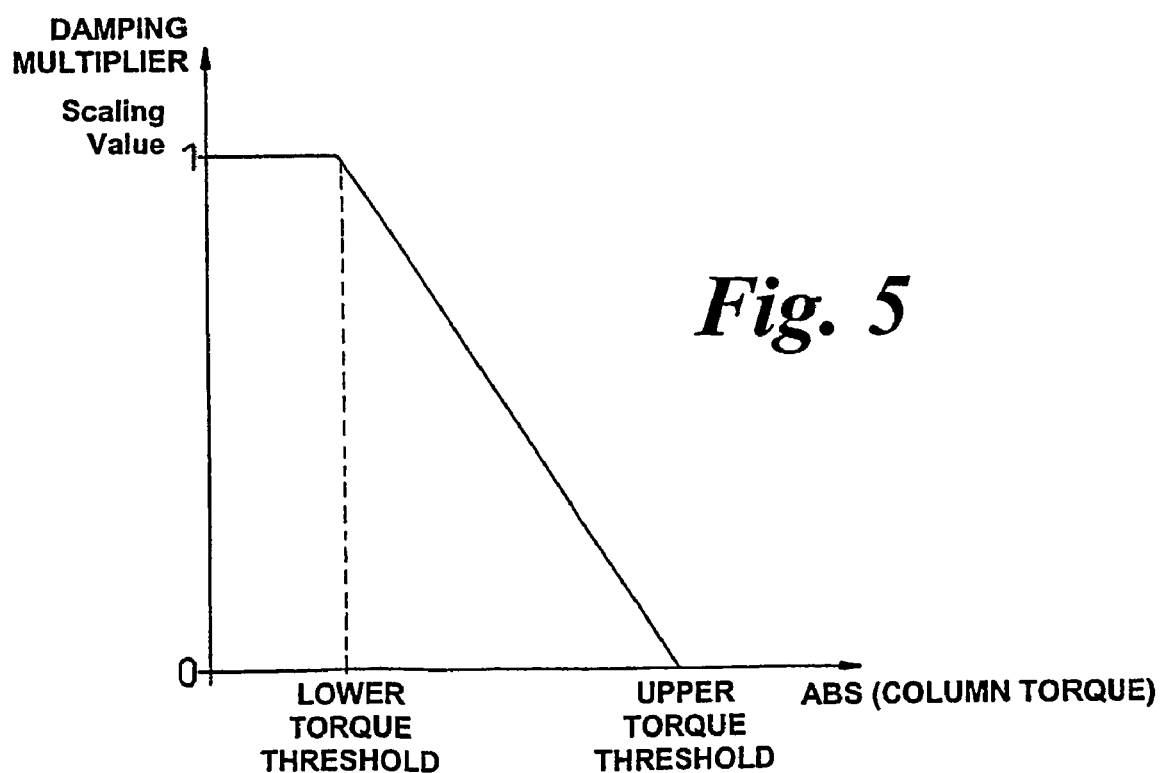
FIG. 5 illustrates the relationship between the value of the damping component and driver applied torque.

The initial scaling value 15 is calculated by determining the magnitude 19 of the torque and mapping the magnitude using a suitable map 20 to produce an initial scaling value 15 that is a function of torque carried by the steering column. The relationship between the torque and the initial scaling value 16 can be seen in detail in FIG. 5 of the accompanying drawings. It increases from unity at zero applied torque to zero at a predetermined threshold applied torque. A deadband is also provided whereby the scaling value remains at or around unity for small torque values around zero torque. The width of the deadband is preferably chosen to exceed the maximum torque that can arise due to inertia in the system.

Figure 6:
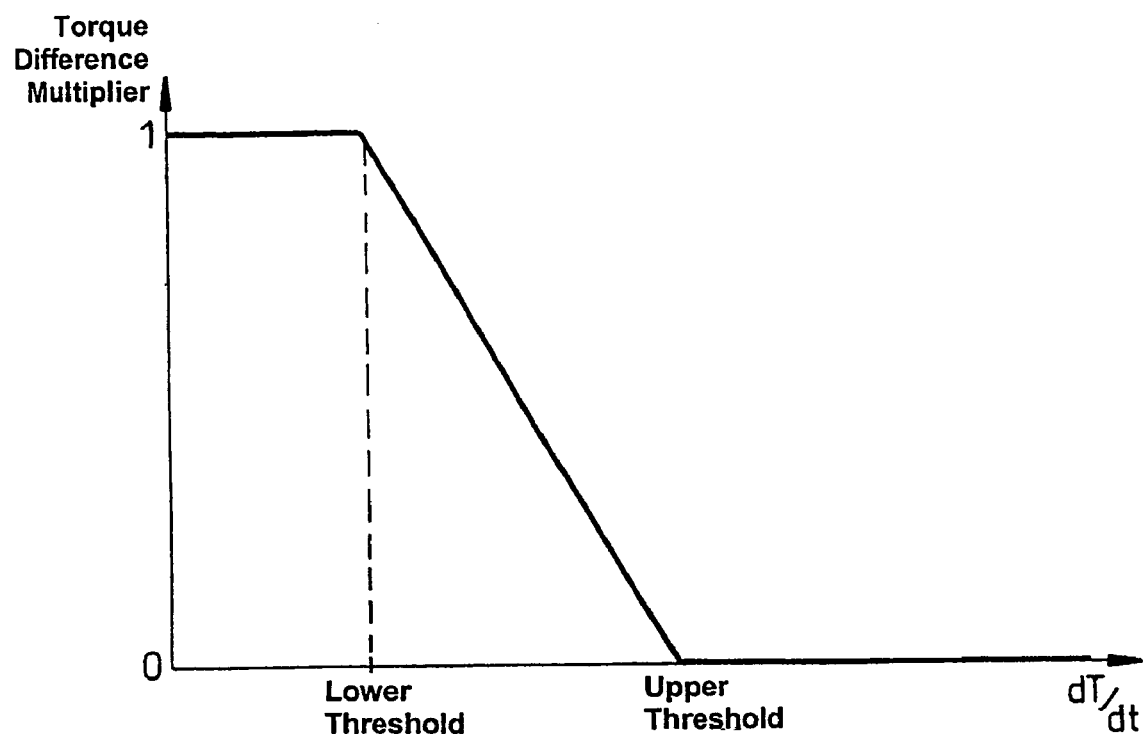
FIG. 6 is a block diagram illustrating an alternative set of functional steps undertaken with the signal processing unit of the system of FIG. 1.

The torque difference value is produced by low pass filtering the torque and differentiating 21 the filtered torque, taking the magnitude 22 of the result of the differentiation and applying a mapping 23 to the magnitude value. The mapping relationship for the torque difference value is shown in more detail in FIG. 6 of the accompanying drawings. It takes a maximum unitary value at low rates of change of torque and drops to a minimum zero value at high rates of change of torque. The transition between these two values occurs linearly between predetermined lower and upper threshold values of the rate of change of torque.

The scaling value and the difference multiplier value are combined in a multiplier stage 24 to produce a modified scaling factor 25. In practice the effect of applying the difference multiplier to the scaling factor is to reduce the damping during a zero torque crossing in a hands on manoeuvre whilst maintaining a useful level of damping during hands off manoeuvres.

After producing the modified scaling factor 25 it is passed through a low-pass filter 18 to remove any high-frequency torque dependent variations in value.

The low-pass filter 18, which is this embodiment has a cut-off frequency of 3 Hz, removes the effect of high speed variation in driver applied torque combing with subsequent high frequency variations in damping component. In certain circumstances, without the presence of the low-pass filter, unwanted vibrations may be produced in the steering column.

The filter may be implemented in a variety of ways which will be readily appreciated by the person skilled in the art. A suitable frequency domain filter may be of the form:

$$X = \frac{\text{damp} - \text{first} - \text{numerator}(Z)}{\text{damp} - \text{first} - \text{denominator}(Z)}$$

where X is the filtered scaling value.

The intermediate signal 12 is multiplied by the scaling factor signal 13 in order to produce the damping component 11. Finally, the signal processor subtracts the damping component 11 from the assistance torque signal 10 to produce the torque demand signal 8 used to drive the electric motor 1.

Figure 8A:
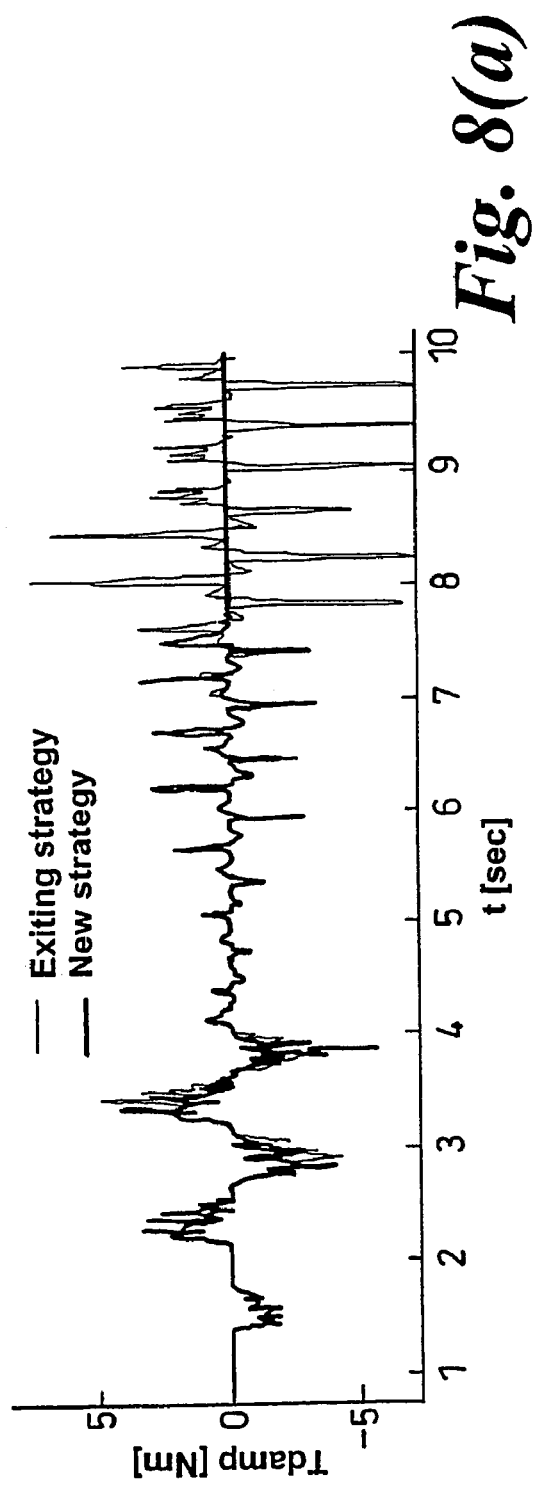
FIG. 8($a$) is a plot of column position against time and FIG. 8($b$) is a plot of damping torque against time for a steering system in accordance with the present invention as fitted to the same passenger vehicle travelling at 70 kph used for the results of FIG. 7($a$) and 7($b$).
Figure 8B:
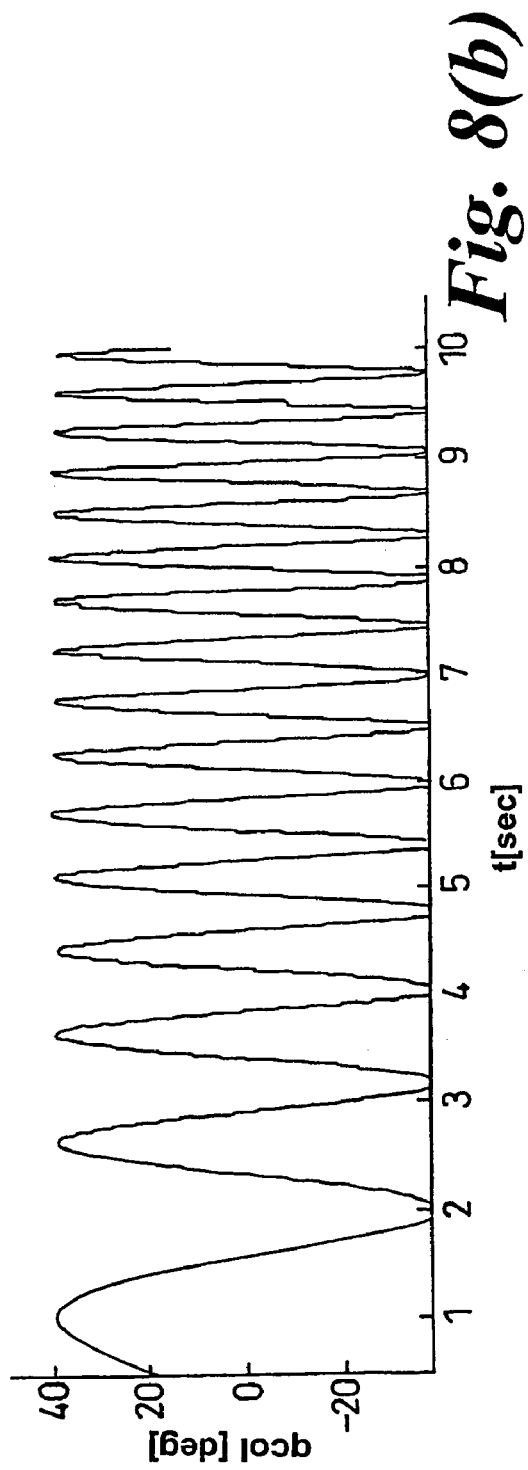

FIGS. 8(a) and 8(b) of the accompanying drawings illustrate the effect of making the damping signal dependent upon the difference in torque over time when compared to an otherwise identical prior art system such as that used to produce the results shown in FIGS. 7(a) and (b). The new results are overlain on the old results, clearly showing that the damping spikes have been reduced.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An electric power assisted steering system comprising: a steering mechanism for a vehicle having a steering wheel and a plurality of road wheels which operatively connects said steering wheel to at least one of said road wheels of said vehicle, a torque sensor arranged to produce a first output signal indicative of a torque carried by a portion of said steering mechanism, a velocity sensor for producing a second output signal indicative of an angular velocity of said steering wheel, a difference means for determining the difference in value of said torque carried by a portion of said column between two points in time to produce a third output signal, an electric motor operatively connected to said steering mechanism, a signal processing unit adapted to receive said first signal, said second signal and said third signal and to produce a torque demand signal representative of a torque to be applied to said steering mechanism by said motor, and a motor drive stage adapted to provide a drive current to said motor responsive to said torque demand signal, wherein said torque demand signal comprises a steering assistance component which is dependent upon said first signal and a damping component that is dependent upon both said first output signal, said second output signal and said third output signal.

2. The system of claim 1 wherein said damping component and assistance component are combined using an additive function.

3. The system of claim 1 wherein said assistance component is produced independently of said second output signal and said third output signal by applying a scaling function to said first output signal.

4. An electric power assisted steering system according to claim 1 wherein said difference means comprises a differentiator which differentiates said torque value represented by said first output signal.

5. An electric power assisted steering system according to claim 4 wherein said system includes a low-pass filter which is arranged to filter said torque signal prior to differentiating.

6. An electric power assisted steering system according to claim 5 wherein a cut-off frequency of said low-pass filter is set to be above a highest expected rate of change that could arise due to movement of said wheel of said vehicle by a driver.

7. An electric power assisted steering system according to claim 1 wherein a magnitude of said damping component increases over a range of steering column velocity values bounded by a first velocity and a second, higher, velocity.

8. An electric power assisted steering system according to claim 7 wherein said first velocity corresponds to a steering column velocity of zero.

9. An electric power assisted steering system according to claim 7 wherein a deadband is provided whereby said damping component value remains at or about zero over a range of velocities bounding zero velocity.

10. An electric power assisted steering system according to claim 7 wherein a rate of increase of said magnitude of said damping component between said first and second values decreases as a function of applied torque.

11. An electric power assisted steering system according to claim 1 wherein: said damping component is produced by a first intermediate value which is a function of said second output signal indicative of an angular velocity of said steering wheel, a second intermediate value by producing a scaling value that is a function of said first output signal indicative of said torque carried by a portion of said steering mechanism, and a third intermediate value by producing a scaling value that is a function of said third output signal from said difference means, and wherein said damping component is produced by multiplying said first intermediate value with said second intermediate value and said third intermediate value.

12. An electric power assisted steering system according to claim 11 wherein said scaling value varies from a maximum value at zero applied torque to a minimum value at a predetermined maximum applied torque and wherein, for torque values at or above the maximum, a zero valued damping component will be produced.

13. An electric power assisted steering system according to claim 11 wherein said scaling value is adapted to be substantially zero valued over a range of measured torque values bounding zero torque.

14. An electric power assisted steering system according to claim 13 wherein said difference value is greater at zero rate of change than at higher rates of change.

15. An electric power assisted steering system according to claim 14 wherein said difference value varies between a maximum value at zero rate of change and a minimum value at a maximum predetermined rate of change.

16. An electric power assisted steering system according to claim 1 wherein said damping component is filtered to remove high frequency variations in said damping component.

* * * * *